United States Patent
Phillipo et al.

(10) Patent No.: US 7,065,506 B1
(45) Date of Patent: Jun. 20, 2006

(54) METHOD AND APPARATUS TO INHIBIT ILLICIT COPYING FROM A RECORD CARRIER TO A COMPUTER-READABLE DATA STORAGE DEVICE

(75) Inventors: Stephen John Phillipo, Reading (GB); Robert David Ellison, Sunnyvale, CA (US); Stuart Keeler, Maindenhead (GB)

(73) Assignee: Macrovision Corporation, Santa Clara, CA (US)

( * ) Notice: Subject to any disclaimer, the term of this patent is extended or adjusted under 35 U.S.C. 154(b) by 539 days.

(21) Appl. No.: 09/444,019

(22) Filed: Nov. 19, 1999

(51) Int. Cl.
*G06F 17/60* (2006.01)

(52) U.S. Cl. ............................. 705/58; 705/51; 705/52; 705/53; 705/54; 705/55; 705/56; 705/57; 705/59; 705/44; 340/5; 707/9; 455/410; 455/411

(58) Field of Classification Search ............. 705/50–59; 340/5; 707/9; 455/410, 411
See application file for complete search history.

(56) References Cited

U.S. PATENT DOCUMENTS 5,857,020 A * 1/1999 Peterson, Jr. ................. 360/60
6,470,085 B1 * 10/2002 Uranaka et al. ............. 380/231

FOREIGN PATENT DOCUMENTS

WO   WO-03/077246-A2 A3   9/2003
WO   WO-2004/109681 A2 A3   12/2004

OTHER PUBLICATIONS

Rallying the Disc Patrol, Dec. 1998, EMedia Professional, v 11, n 12, p 34+.*

* cited by examiner

*Primary Examiner*—James A. Reagan
(74) *Attorney, Agent, or Firm*—Morrison & Foerster LLP (57) ABSTRACT

A technique to prevent illicit copying of a copy-protected CD-ROM into a computer-readable storage drive is presented. In accordance with the present invention, when an authentic copy-protected CD-ROM is inserted into a CD drive and the content of the copy-protected CD-ROM is installed onto a hard disk drive that is linked to the CD drive, the Central Processor Unit (CPU) executes the installer instructions residing in the CD-ROM to create a license file in the hard disk drive. For security reasons, the content of the CD-ROM (e.g., the executable file of the application) is encrypted. When the content of the CD-ROM is copied into the hard disk drive, it remains encrypted. The license file essentially acts as a timer to monitor a predetermined time interval that has been programmed into the license file. If a user attempts to launch the encrypted copied application residing in the hard drive at any time prior to the expiration of the predetermined time interval, the license file readily supplies the key code to enable a filter to decode the encrypted installed application thereby allowing the application to launch. At the expiration of the predetermined time interval, the license file withholds the key code therefore not allowing the installed application to be decrypted and successfully launched. The predetermined time interval can be reset by reinserting the copy-protected CD-ROM into the CD drive to reset the time interval.

36 Claims, 5 Drawing Sheets

COPY ENCRYPTED APPLICATION
INTO HARD DISK DRIVE

INSTALL LICENSE MANAGEMENT
SYSTEM INTO HARD DISK DRIVE

METHOD AND APPARATUS TO INHIBIT ILLICIT COPYING FROM A RECORD CARRIER TO A COMPUTER-READABLE DATA STORAGE DEVICE

FIELD OF THE INVENTION

The invention generally relates to copy protection and more particularly to a method to prevent illicit copying of software from record carriers to computer-readable data storage drives.

BACKGROUND OF THE INVENTION

Despite its compact size, each Compact Disc (CD) in its many forms (e.g., CD-ROM, CD-R, CD-RW, CD-DA, CD-I, etc.) can be used to store enormous amounts of data (i.e., 650 MB) including audio, text, software codes, graphics, etc. In addition, CDs are subject to no mechanical wear and tear and are therefore very reliable. As a result, CDs have become the preferred portable data storage format in recent years. Indeed, software products (e.g., application software, video games, etc.) are currently distributed by software publishers almost exclusively on CD-ROM format. However, it is estimated that software and video game publishers lose billions of dollars worldwide to product piracy each year. While most CD-ROM software piracy losses are attributable to counterfeiting by professional pirates, with the availability of CD Recordable (CD-R) drives at an affordable price, the average consumers can now make perfect copies of CD-ROM originals for the price of a blank disc.

One effective solution to the problem of unauthorized (illicit) software copying is provided by Macrovision Corporation of Sunnyvale, Calif. through its C-dilla Subsidiary. This anti-copy solution involves encrypting the executable file of the application (i.e., CD-ROM's software content) according to a production key and embedding a digital signature corresponding to the production key onto the CD-ROM during manufacturing. The hidden digital signature can only be detected using special authentication software provided with the CD-ROM at boot-up. Upon detecting and authenticating the digital signature, information in the digital signature is used as a key to decrypt the encrypted executable file of the software content thereby allowing the application to launch. If the digital signature is not detected, the encrypted executable file of application cannot be decrypted for launch. The digital signature is designed so that it cannot be copied. In other words, when a copy protected CD-ROM is copied to another CD or to a computer-readable storage drive (e.g., computer hard drive), the digital signature cannot be transferred to the copied CD or storage drive thereby preventing the copied application from being launched. Hence, a copied CD is essentially useless.

On the other hand, although the digital signature is not transferred to a computer-readable data storage device when the content of a copy-protected CD-ROM is copied into the storage device, the copied application can still be launched as long as the copy-protected CD-ROM remains in the CD-ROM drive because the digital signature residing in the copy-protected CD-ROM can still be detected and authenticated. By requiring the copy-protected CD-ROM to remain in the CD-ROM drive for the copied application in the storage device to be able to launch, illicit copying of a copy-protected CD-ROM into a storage device of someone other than the rights-owner is prevented. A rights-owner is defined as someone who is the rightful owner of the copy-protected CD-ROM. At the same time, the ability of the rights-owner to copy the content of the copy-protected CD-ROM into his computer-readable data storage device is basically preserved because, as the rights-owner, he is assumed to have the copy-protected CD-ROM readily available nearby. However, by requiring the copy-protected CD-ROM to be inserted into the CD-ROM drive each time to launch the copied application, the use of the CD-ROM drive may not be utilized by other applications. At the very least, this is an inconvenience. At worst, this prevents the rights-owner from concurrently using multiple applications that are copy-protected. Such inconvenience is exacerbated for laptop users because they are now required to bring along the application software CD-ROMs while traveling. As a result, software publishers are torn between the desire to protect their intellectual property and the desire to supply the consumers with user-friendly products. In this difficult position the software publishers are faced with either lost revenue from the illicit copying of their products or lost revenue from losing market share.

Thus, a need exists for an improved method to discourage illicit copying of a copy-protected CD-ROM into a computer-readable data storage device without requiring the copy-protected CD-ROM to be inserted in the CD-ROM drive to successfully launch the copied application from the data storage device.

SUMMARY OF THE INVENTION

Accordingly, the present invention provides an improved method to discourage illicit copying of a copy-protected CD-ROM into a computer-readable data storage device without requiring the copy-protected CD-ROM to be inserted in the CD-ROM drive to successfully launch the copied application from the data storage device.

The present invention meets the above need with a method to discourage illicit copying from a digital record carrier to a computer-readable data storage device. As part of the method, the content of the digital record carrier is encrypted. Next, determination is made as to whether a predetermined time interval has lapsed since the digital record carrier was last inserted for use. If the predetermined time interval has not lapsed, the content of the digital record carrier that has been installed onto the computer-readable data storage device is decrypted into a random access memory thereby allowing the copied content to launch for use. Otherwise, if the predetermined time interval has lapsed, the content of the digital record carrier that has been installed onto the computer-readable data storage device is prevented from being decrypted thereby not allowing the copied content to launch for use. Under the present invention, re-inserting the digital record carrier resets the predetermined time interval.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well-known methods, procedures, components, and circuits have not been described in detail as not to unnecessarily obscure aspects of the present invention. Although the following description describes the present invention in the context of preventing illicit copying of the content of a CD-ROM to a hard disk drive, it should be clear to a person of ordinary skill in the art that the present invention can be used to prevent the illicit copying from any type of optical record carrier such as CD-Digital Audio (CD-DA), CD-Recordable (CD-R), CD-Rewritable (CD-RW), Digital Versatile Disc (DVD), etc. to any type of computer-readable data storage device including hard disk drives, tape drives, and others.

In accordance with the present invention, when an authentic copy-protected CD-ROM is first inserted into a CD drive, the Central Processor Unit (CPU) executes the installer instructions residing in the CD-ROM to automatically copy the encrypted application (i.e., encrypted main application software) into the hard disk drive and to install a license management system that is used to control license management and to detect the authentic copy-protected CD-ROM. For security reasons, the content of the CD-ROM (e.g., the executable file of the application and other relevant files are encrypted. Upon completing the installation phase, when the user attempts to launch the encrypted copied application residing in the hard drive at any time prior to the expiration of the predetermined time interval, the license management system readily supplies the key to enable a filter to decode the encrypted copied application thereby allowing the application to launch. Following the expiration of the predetermined time interval or if the inserted CD-ROM cannot be authenticated, the license management system withholds the key therefore not allowing the copied application to be decrypted and successfully launched. When prompted by the shell, the predetermined time interval can be reset by reinserting the copy-protected CD-ROM into the CD drive to reset the time interval.

In so doing, the present invention makes the CD drive available to the rights-owner (i.e., the CD-ROM owner) for other applications while the application copied from the copy-protected CD-ROM is running. The present invention also allows portable computer users to not having to carry all of their copy-protected CD-ROMs on the road. At the same time, by requiring reinsertion of the copy-protected CD-ROM periodically, the copy-protected CD-ROM is regularly required nearby thereby discouraging the illicit copying of a copy-protected CD-ROM into a hard drive of someone other than the rights-owner. This is because it is a major inconvenience of the illicit copier to keep borrowing the copy-protected CD-ROM from the rights-owner.

As an alternate embodiment, the key can be obtained through a remote transaction via the Internet, the telephone, email, fax, etc. In this embodiment, following the expiration of the predetermined time interval, the user can communicate with a known remote central depository, maintained by the software publisher or developer to obtain a key in exchange for some information (e.g., a password) to decrypt the copied application thereby allowing it to be launched for use. The alternate embodiment, which also allows the rights-owner to enjoy most if not all of the benefits provided by the present invention as discussed above, is desirable especially if the original CD-ROM is not available (e.g., misplace) or if a directly connected CD-ROM drive is temporarily unavailable.

Figure 1:
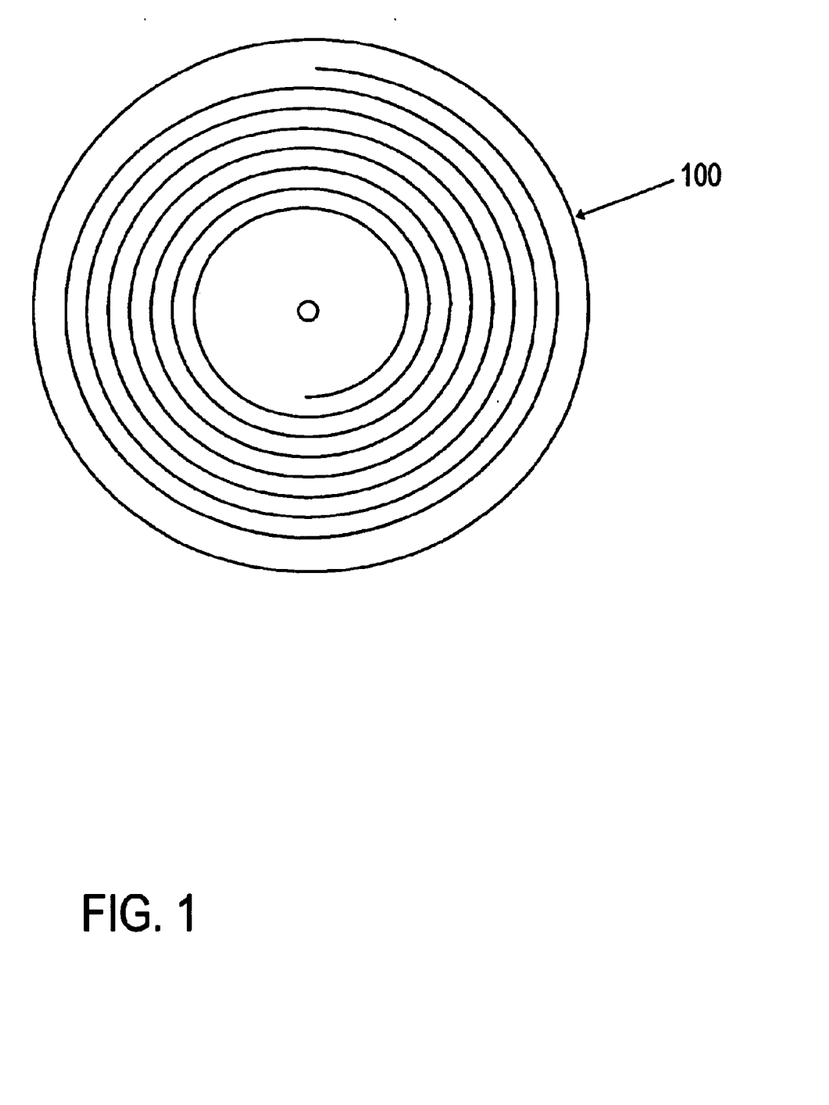
FIG. 1 is a diagram illustrating an exemplary CD-ROM 100 that is copy-protected in accordance with the present invention.

Reference is now made to FIG. 1 illustrating an exemplary CD-ROM 100 that is copy-protected in accordance with the present invention. In addition to an encrypted executable file of the application software product (not shown), copy-protected CD-ROM 100 stores at least installer instructions 110 (not shown) and filter instructions 120 (not shown) that are needed to prevent illicit copying of CD-ROM 100 into a hard disk drive. To further prevent illicit copying of CD-ROM 100 to another CD, copy-protected CD-ROM 100 may further include embedded digital signature 130 (not shown) and authentication instructions 140 (not shown). In the preferred embodiment, digital signature 130 is added to the Glass Master with the software publisher's content (e.g., application) already in place using a Laser Beam Recorder (LBR) by a mastering facility or replicator using the Master Interface Software (MIS) developed by Doug Carson Associates (DCA). Using the glass master, a. CD. Replicator can mass-produce Silver Discs with digital signature 130 and the encrypted content ready for use by the consumers. The aforementioned manufacturing steps are well known and should be obvious to a person of ordinary skill in the art.

Digital signature 130 is hidden and can only be detected using executed authentication instructions 140. Upon detecting and authenticating digital signature 130, information in digital signature 130 is used as a key to decrypt the encrypted executable file of the software content thereby allowing the application to launch. If digital signature 130 is not detected, the encrypted executable file of application cannot be decrypted for launch. Digital signature 130 is designed so that it cannot be copied. In other words, when copy protected CD-ROM 100 is copied to another CD or to a computer-readable storage drive (e.g., computer hard drive), the digital signature cannot be transferred to the copied CD or storage drive thereby preventing the encrypted copied application from being launched. In accordance with the present invention, a license file storing the decryption key/code derived from digital signature 130 is used to provide the decryption key/code to launch a copied application in a hard disk drive. Such license file and other components relevant to the present invention are discussed in greater detail below.

Figure 2:
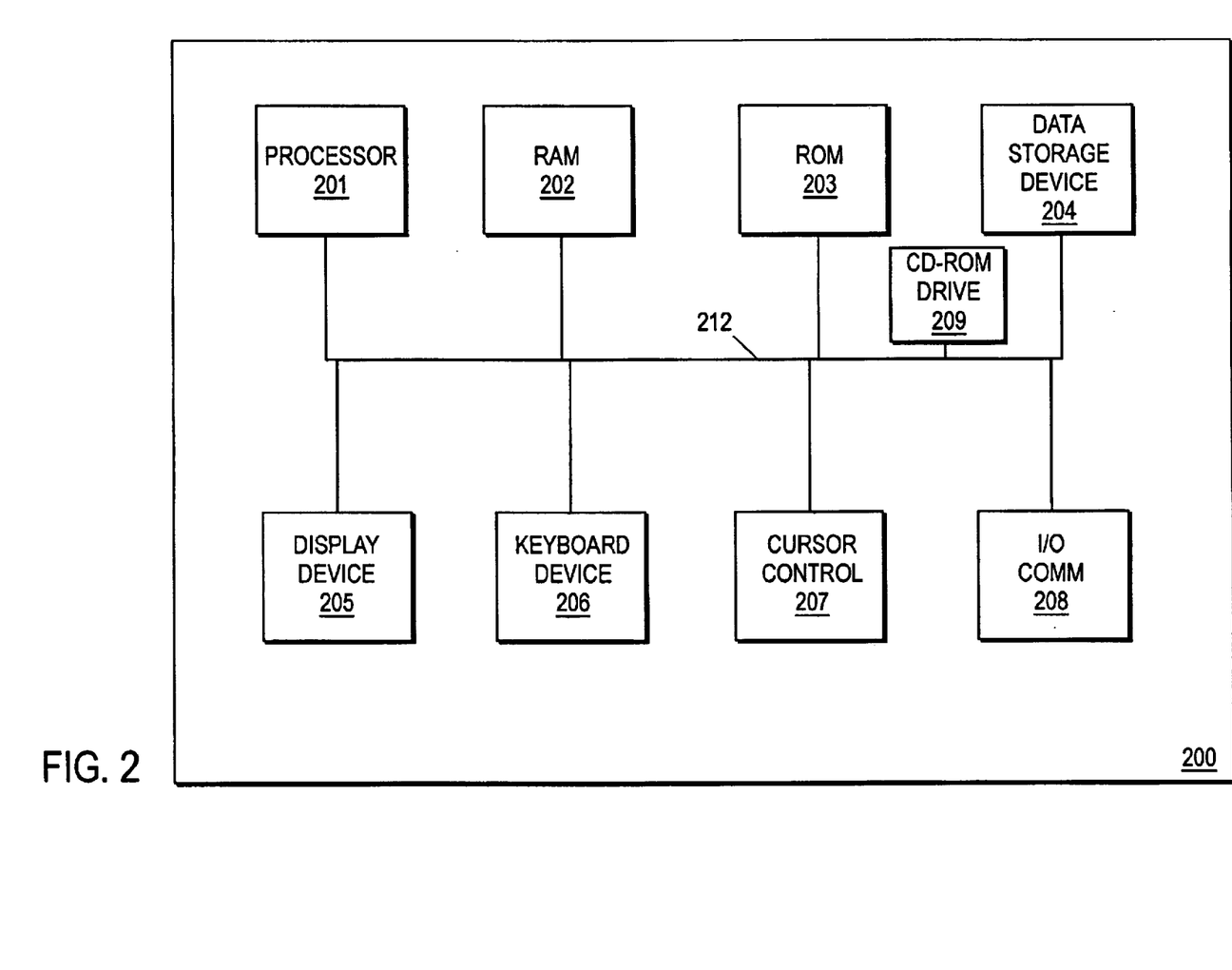
FIG. 2 is a block diagram illustrating, as an example, computer system 200 upon which the present invention may be practiced.

Referring now to FIG. 2 illustrating a block diagram of exemplary computer system 200 upon which the present invention may be practiced. It is to be appreciated that computer system 200 is exemplary only and that the present invention can operate within a number of different computer systems and computerized devices including general-purpose computer systems and others. In the following discussions of the present invention, certain processes and steps are realized as a series of instructions (e.g., software program) that reside within computer readable storage devices and memory units of system 200 and executed by processor 201.

In general, computer system 200 upon which the present invention is practiced comprises address/data bus 212 for conveying information and instructions, central processor 201 coupled with bus 212 for processing information and instructions, a random access memory (RAM) 202 for storing digital information and instructions, a read only memory (ROM) 203 for storing information and instructions of a more permanent nature. In addition, computer system 200 further include hard disk drive 204 for storing vast amounts of data such as the data copied from a CD-ROM, a CD drive 209 for reading copy-protected CD-ROM 100 in accordance with the present invention, I/O interface 208 for interfacing with peripheral devices (e.g., computer network, modem, etc.). Moreover, computer system 200 may include display device 205 for displaying information to a computer user, an alphanumeric input device 206 (e.g., keyboard), and a cursor control device 207 (e.g., mouse, trackball, lightpen, etc.) for communicating user input information and command selections.

Figure 3:
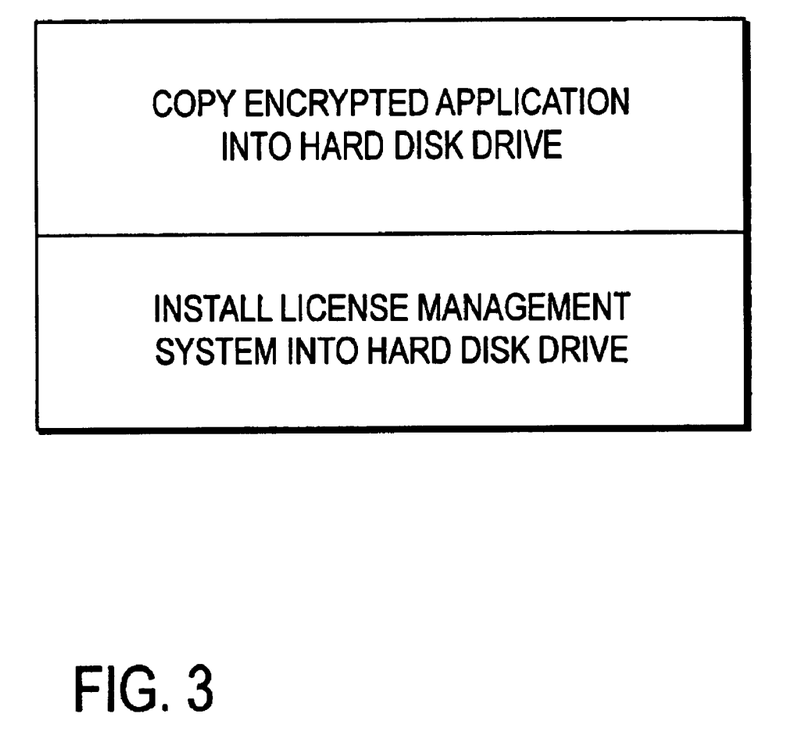
FIG. 3 is a chart illustrating the functions that the executed installer instructions 110 perform when copy-protected CD-ROM 100 is inserted into CD drive 209 for the first time.

Reference is now made to FIG. 3 illustrating the functions that the executed installer instructions 110 perform when copy-protected CD-ROM 100 is inserted into CD drive 209 for the first time. Installer instructions 110 may be an executable file. When installer instructions 110 are executed by central processor 201, the encrypted application (i.e., encrypted main application software) is automatically copied into hard disk drive 204. The executed installer instructions 110 also install license management system 320 onto the hard disk drive 204. In general, license management system 320 is designed to control license management and to detect an authentic copy-protected CD-ROM. License management system 320 may be an executable file that is executed by central processor 201 whenever a user attempts to launch the copy-protected application software. The implementation of installer instructions 110 to carry out the aforementioned functions using system facilities available on computer system 200 should be obvious to a person of ordinary skill in the art. Hence, specific detail of such implementation is not further discussed for brevity and simplicity sake.

Figure 4:
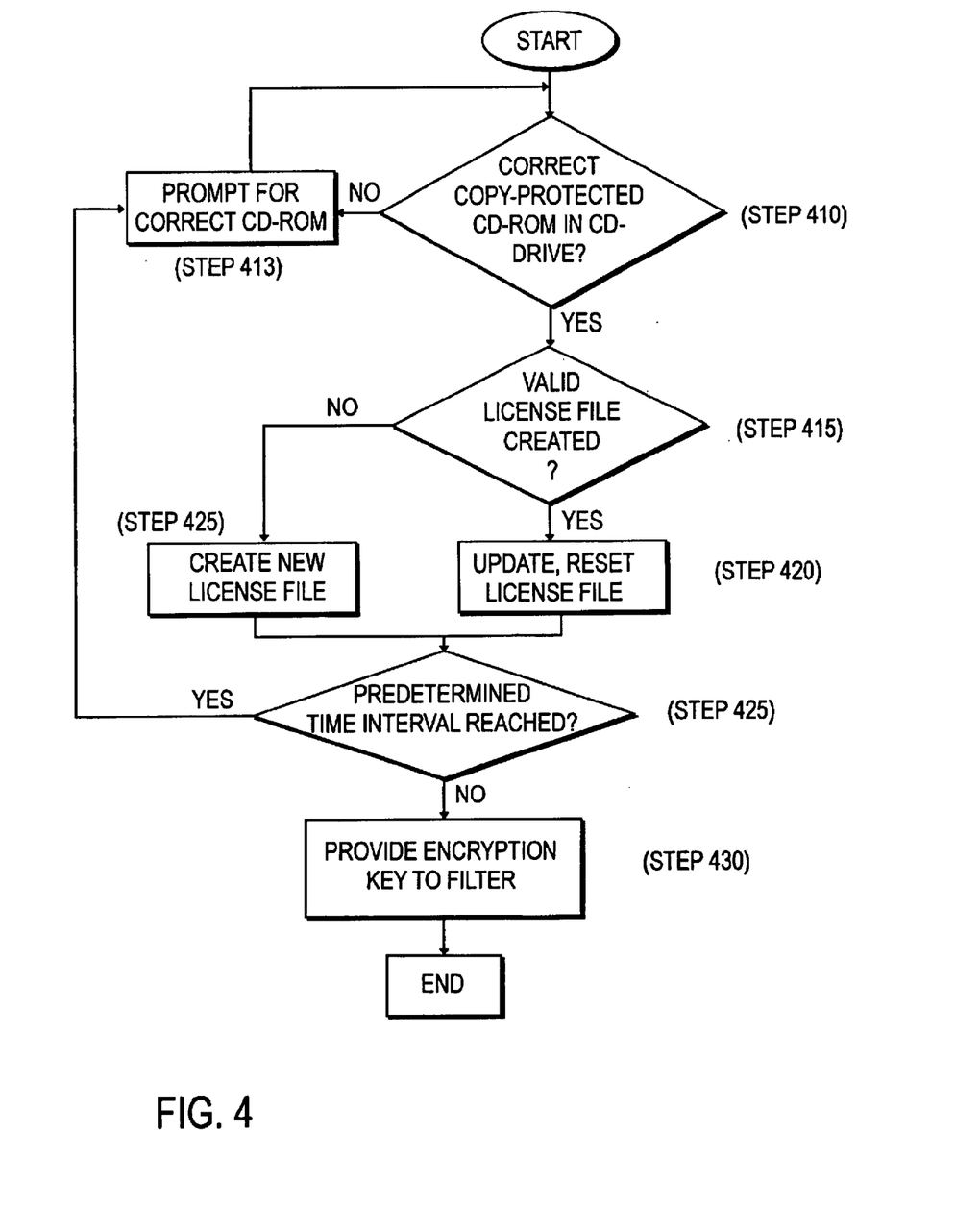
FIG. 4 is a flow chart of the steps performed by license management system 320.

Referring now to FIG. 4 illustrating a flow diagram of the license management system 320. When a user attempts to launch the copy-protected application software, central processor 201 executes shell program 330 to determine whether a correct copy-protected CD-ROM (e.g., a CD-ROM whose identification number matches the application software content in the CD-ROM) is in CD drive 209 (step 410). If a correct copy-protected CD-ROM cannot be ascertained, shell program 450 (not shown) prompts for the correct CD-ROM (step 413) before continues the monitoring. Otherwise, if a correct copy-protected CD-ROM is ascertained, executed shell program 450 determines whether a valid license file 460 (not shown) has already been created for CD-ROM 100 carrying the application software (step 415). If license file 420 has already existed, executed shell program 450 updates the information in license file 460 (step 420). Otherwise, if license file 460 has not been created, executed shell program 450 creates a new license file 460 in hard disk drive 204 (step 425).

License file 420 is essentially a data file that includes the value of the predetermined time interval, the time and date when copy-protected CD-ROM 100 was last inserted into CD-ROM drive 209, the present time and date, the identity of the software product in copy-protected CD-ROM 100, the software product's protection information, and others. When CD-ROM 100 is first inserted into hard disk drive 204, the time and date at that moment is recorded in license file 420 as the time and date when CD-ROM 100 was last inserted. At each subsequent insertion of CD-ROM 100, the installer instructions update the time and date when CD-ROM 100 was last inserted. In the preferred embodiment, the present time and date is updated every 20 minutes. Accordingly, using the stored information on the time and date when CD-ROM 100 was last inserted and the present time and date, a determination of whether the predetermined time interval has been reached can be made (step 425). Hence, the main function of the license file is to monitor the time duration since copy-protected CD-ROM 100 was last inserted into CD-ROM drive 209.

For security reason, the license file is also encrypted to prevent unauthorized access to the predetermined time interval and/or the present time and date. The exact encryption method employed is not important as long as its identity is kept confidential from hackers for security reasons. This is so because access to the aforementioned information means that the information may be altered to defeat the copy-protected aspect of the present invention. For example, the predetermined time interval, the time and date when CD-ROM 100 was last inserted, and/or the present time and date can be changed to fool the system into thinking that the time interval has not expired. The identity of the software product may be a code name or number and is used to ensure that the proper CD-ROM is inserted before access to the license file is allowed for alteration. This prevents a hacker to get access to the license file by using a different copy-protected CD-ROM. In the preferred embodiment, product protection information is a decryption code/key used in decrypting the application. Such decryption code/key is derived from digital signature 130 that was embedded in CD-ROM 100 during manufacturing. When digital signature 130 is detected by authentication instruction 140, which may be an executable file, during the detection and authentication process, it is passed to shell program 450 to record into the license file as the decryption code/key. In an alternate embodiment, the code/key can be obtained through a remote transaction via the Internet, the telephone, email, fax, etc. In this alternate embodiment, following the expiration of the predetermined time interval, the user can communicate with a known remote central depository, maintained by the software publisher or developer to obtain a code/key in exchange for some information (e.g., a password) or a license fee to use in decrypting the copied application thereby allowing it to be launched for use. Such remote central depository may be a key computer server connecting to the World Wide Web if the transaction is an Internet transaction. Such remote central depository may also be a data base operated by a service operator if the transaction is a manual one that involves the use of telephone, email, fax, etc. The alternate embodiment, which also allows the rights-owner to enjoy most if not all of the benefits provided by the present invention as discussed above, is desirable especially if the original CD-ROM is misplaced. The implementation of shell program 450 to carry out the aforementioned functions using system facilities available on computer system 200 should be obvious to a person of ordinary skill in the art. Hence, specific detail of such implementation is not further discussed for brevity and simplicity sake.

The executable file of the software application is encrypted prior to manufacturing of CD-ROM-100. In so doing, the copied application cannot be launched from the hard disk drive unless a valid license file is present in order to allow the application to be decrypted. In accordance with the present invention, decryption is allowed only if the set time interval has not expired. In the preferred embodiment, decryption is carried out using filter instructions 120 which may be an executable file. In the preferred embodiment, encrypted files are decrypted by executing filter instructions 120 to perform as an operating system filter into RAM 202 (not hard disk drive 204). As such, the decryption is performed on in real time. In other words, the parts of an encrypted file are decrypted as the operating system requests it. Filter instructions 120 are enabled to decrypt only if the set time interval has not expired. Preferably, filter instructions 120 are enabled in response to the decryption code/key that is provided by the license file. The license management system makes available the decryption code/key only if the set predetermined time interval is not yet expired (step 430). Otherwise, if the time interval has already expired, the license management system does not make available the decryption code/key to the filter but rather prompts the user to re-insert copy-protected CD-ROM 100 by going back to step 413. Filter instructions 120 may be installed from CD-ROM 100 onto hard disk drive 204. When enabled by the decryption code/key and executed by central processor 201, filter instructions 120 decrypt the encrypted executable file for the application.

Figure 5:
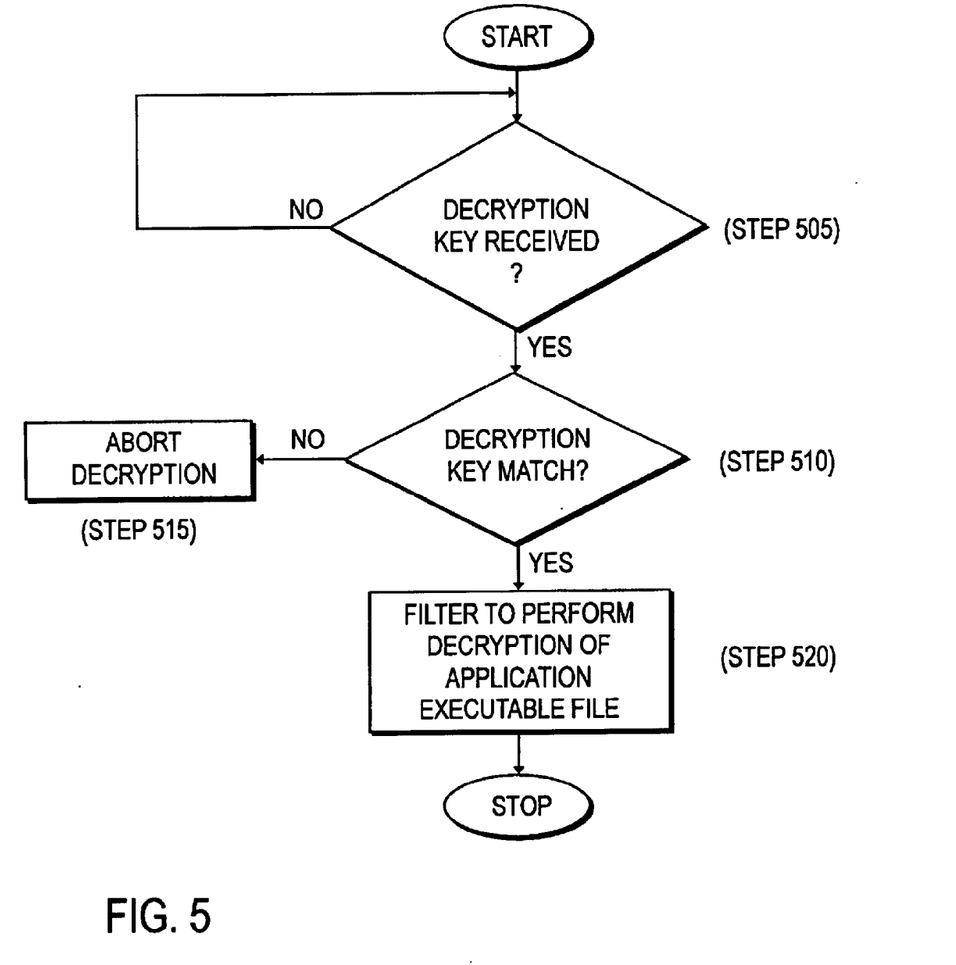
FIG. 5 is a flow chart of the steps performed by executed filter instructions 120.

Referring now to FIG. 5 illustrating the steps performed by filter instructions 120 when executed by central processor 201. In step 505, filter instructions 120 monitor the input to determine whether the decryption code/key from the license file has been received. If the decryption code/key has not been received, filter instructions 120 continue to monitor the input. Otherwise, the decryption code/key has been received, filter instructions compare the code/key received with an internal stored code/key to determine whether there is a match (step 510). If there is no match indicating an error condition (e.g., someone may have tampered with the license file, etc.), filter instructions 120 reject the encryption code/key and aborts the effort to decrypt the encrypted executable file of the application (step 515). Otherwise, if there is a match, filter instructions 120 perform the reverse of the encrypted steps that were carried out to encrypt the executable file of the application (step 520). Because the software developers were the ones who encrypted the application, they know the encrypted steps. Accordingly, decrypted steps to basically reverse to process can easily be implemented into filter instructions 120. As an example, a simplistic encryption of the executable file of the application may involve inverting the binary values of the executable file. Hence, to decrypt the encrypted executable file simply involves inverting the binary values of the encrypted executable file back to their original values. The implementation of filter instructions 120 to perform the aforementioned functions using system facilities available on computer system 200 should be obvious to a person of ordinary skill in the art. Hence, specific detail of such implement is not further discussed for brevity and simplicity sake.

The preferred embodiment of the present invention, a technique to discourage illicit copying of a copy-protected CD-ROM into a computer-readable data storage device without requiring the copy-protected CD-ROM to be inserted in the CD-ROM drive to successfully launch the installed application from the storage drive, is thus described. While the present invention has been described in particular embodiments, the present invention should not be construed as limited by such embodiments, but rather construed according to the below claims.

What is claimed is:

1. A method to discourage illicit copying from a digital record carrier to a computer-readable data storage device comprising:

encrypting at least a portion of a content of the digital record carrier;

inserting the digital record carrier into a drive;

copying the content of the digital record carrier to the computer-readable data storage device;

monitoring whether a predetermined time interval has lapsed since the digital record carrier was last inserted for use;

if the predetermined time interval has not lapsed, decrypting the content of the digital record carrier that has been copied thereby allowing the copied content to launch for use with the digital record carrier not inserted in the drive; and if the predetermined time interval has lapsed, preventing the content of the digital record carrier that has been copied from being decrypted thereby not allowing the copied content to launch for use.

2. The method of claim 1 further comprising the step of re-inserting the digital record carrier to reset the predetermined time interval.

3. The method of claim 1 further comprising the steps of:

embedding a digital signature into the digital record carrier during manufacturing wherein the digital signature is not transferable during the copying of the digital record carrier to another digital record carrier or to the computer-readable data storage device; and if the digital signature is detected and authenticated, decrypting the content of the digital record carrier thereby allowing the content of the digital record carrier to be launched for use; and if the digital signature is not detected and authenticated, preventing the content of the digital record carrier from being decrypted thereby not allowing the content of the digital record carrier to be launched for use.

4. The method of claim 2, wherein the monitoring step includes:

creating a file for storing a predetermined time interval value, time information on when the digital record carrier was last inserted, current time information, a decryption key, and identification information for the digital record carrier;

determining whether the predetermined time interval has lapsed;

providing the decryption key if the predetermined time interval has not lapsed; and withholding the decryption key if the predetermined time interval has lapsed.

5. The method of claim 4, wherein the file is encrypted.

6. The method of claim 5, wherein the decryption key is obtained from the file.

7. The method of claim 5, wherein the decryption key is obtained from a remote central depository.

8. The method of claim 5, wherein the current time information is updated every 20 minutes.

9. The method of claim 5, wherein the decrypting step involves using the decryption key when made available to enable a filter to decrypt the content of the digital record carrier that has been installed onto the computer-readable data storage device into a random access memory.

10. A digital record carrier storing an encrypted content having at least a portion encrypted, the record carrier further storing instructions, that when executed by a central processor following insertion of the digital record carrier into a drive and a copying of the content of the digital record carrier into a computer-readable data storage device, monitoring whether a predetermined time interval has lapsed since the digital record carrier was last inserted for use, if the predetermined time interval has not lapsed, decrypting the copied content of the digital record carrier thereby allowing the copied content to launch for use with the digital record carrier not inserted in the drive, if the predetermined time interval has lapsed, preventing the copied content of the digital record carrier from being decrypted thereby not allowing the copied content to launch for use.

11. The digital record carrier of claim 10, wherein the predetermined time interval is reset by re-inserting the digital record carrier.

12. The digital record carrier of claim 11, wherein monitoring involves installing a file in the computer-readable data storage device, the file storing a predetermined time interval value, time information on when the digital record carrier was last inserted, current time information, a decryption key, and identification information for the digital record carrier, the file determining whether the predetermined time interval has lapsed, and if the predetermined time interval has not lapsed, the file providing the decryption key, and if the predetermined time interval has lapsed, the file withholding the decryption key.

13. The digital record carrier of claim 12, wherein the file is encrypted.

14. The digital record carrier of claim 13, wherein the decryption key is obtained from the file.

15. The digital record carrier of claim 13, wherein the decryption key is obtained from a remote central depository.

16. The digital record carrier of claim 13, wherein the current time information is updated every 20 minutes.

17. The digital record carrier of claim 13, wherein decrypting involves using the decryption key when made available to enable a filter to decrypt the content of the digital record carrier that has been installed onto the computer-readable data storage device into a random access memory.

18. The digital record carrier of claim 10 having a digital signature embedded into the digital record carrier during manufacturing wherein the digital signature is not transferable during the copying of the digital record carrier to another digital record carrier or to the computer-readable data storage device, wherein if the digital signature is detected and authenticated, the instructions, when executed by the central processor, decrypting the content of the digital record carrier thereby allowing the content of the digital record carrier to be launched for use, if the digital signature is not detected and authenticated, the instructions, when executed by the central processor, preventing the content of the digital record carrier from being decrypted thereby not allowing the content of the digital record carrier to be launched for use.

19. A method to inhibit copying from a digital record carrier to a computer-readable data storage device comprising:

encrypting at least a portion of a content of the digital record carrier;

inserting the digital record carrier into a drive;

copying the content of the digital record carrier to the computer-readable data storage device;

monitoring whether a predetermined time interval has lapsed since the digital record carrier was last inserted in the computer-readable data storage device for use;

if the predetermined time interval has not lapsed, decrypting the content of the digital record carrier that has been copied thereby allowing use of the installed content with the digital record carrier not inserted in the drive; and if the predetermined time interval has lapsed, preventing the content of the digital record carrier that has been copied from being decrypted thereby not allowing use of the content.

20. The method of claim 19 further comprising re-inserting the digital record carrier to reset the predetermined time interval.

21. The method of claim 19 further comprising:

embedding a digital signature into the digital record carrier during manufacturing wherein the digital signature is not transferable during copying of the digital record carrier to another digital record carrier or to the computer-readable data storage device; and if the digital signature is detected and authenticated, decrypting the content of the digital record carrier thereby allowing the content of the digital record carrier to be launched for use; and if the digital signature is not detected and authenticated, preventing the content of the digital record carrier from being decrypted thereby not allowing the content of the digital record carrier to be launched for use.

22. The method of claim 20, wherein the monitoring includes:

creating a file for storing a predetermined time interval value, time information on when the digital record carrier was last inserted, current time information, a decryption key, and identification information for the digital record carrier;

determining whether the predetermined time interval has lapsed;

providing the decryption key if the predetermined time interval has not lapsed; and withholding the decryption key if the predetermined time interval has lapsed.

23. The method of claim 22, wherein the file is encrypted.

24. The method of claim 23, wherein the decryption key is obtained from the file.

25. The method of claim 23, wherein the current time information is updated every 20 minutes.

26. The method of claim 23, wherein the decryption key is obtained from a remote central depository.

27. The method of claim 23, wherein the decrypting involves using the decryption key when made available to enable a filter to decrypt the content of the digital record carrier that has been installed onto the computer-readable data storage device into a random access memory.

28. A digital record carrier storing content at least a portion of which is encrypted, the record carrier further storing instructions that when executed by a processor following insertion of the digital record carrier and installation of the content of the digital record carrier into a computer-readable data storage device, monitor whether a predetermined time interval has lapsed since the digital record carrier was last inserted for use in the computer-readable data storage device, and if the predetermined time interval has not lapsed, the instructions decrypt the copied content of the digital record carrier thereby allowing the copied content to be used with the digital record carrier not inserted in the drive, and if the predetermined time interval has lapsed, the instructions prevent the copied content of the digital record carrier from being decrypted thereby not allowing the installed content to be used.

29. The digital record carrier of claim 28, wherein the predetermined time interval is reset by re-inserting the digital record carrier.

30. The digital record carrier of claim 29, wherein the instructions that perform the monitoring install a file in the computer-readable data storage device, the file storing a predetermined time interval value, time information on when the digital record carrier was last inserted, current time information, a decryption key, and identification information for the digital record carrier, the file determining whether the predetermined time interval has lapsed, and if the predetermined time interval has not lapsed, the file providing the decryption key, and if the predetermined time interval has lapsed, the file withholding the decryption key.

31. The digital record carrier of claim 30, wherein the file is encrypted.

32. The digital record carrier of claim 31, wherein the decryption key is obtained from the file.

33. The digital record carrier of claim 31, wherein the decryption key is obtained from a remote central depository.

34. The digital record carrier of claim 31, wherein the current time information is updated every 20 minutes.

35. The digital record carrier of claim 31, wherein decrypting involves using the decryption key when made available to enable a filter to decrypt the content of the digital record carrier that has been installed onto the computer-readable data storage device into a random access memory.

36. The digital record carrier of claim 28 having a digital signature embedded into the digital record carrier during manufacturing wherein the digital signature is not transferable during the copying of the digital record carrier to another digital record carrier or to the computer-readable data storage device, wherein if the digital signature is detected and authenticated, the instructions, when executed by the central processor, decrypting the content of the digital record carrier thereby allowing the content of the digital record carrier to be launched for use, if the digital signature is not detected and authenticated, the instructions, when executed by the central processor, preventing the content of the digital record carrier from being decrypted thereby not allowing the content of the digital record carrier to be launched for use.

* * * * *